United States Patent [19]

Miller

[11] 4,361,177
[45] Nov. 30, 1982

[54] FOLDING BOW SAW

[75] Inventor: Jack V. Miller, Sierra Madre, Calif.

[73] Assignee: Acroform Corporation, Industry, Calif.

[21] Appl. No.: 114,213

[22] Filed: Jan. 22, 1980

[51] Int. Cl.³ .............................................. B27B 21/00
[52] U.S. Cl. ................... 145/33 E; 145/31 R; 145/33 A
[58] Field of Search ............... 145/32 R, 31 R, 32 A, 145/32 B, 33 R, 33 E

[56] References Cited

U.S. PATENT DOCUMENTS

| 1,565,861 | 12/1925 | McIntire | 145/31 R |
| 2,595,288 | 5/1952 | Peters | 145/33 E |
| 2,910,101 | 10/1959 | Canfield | 145/33 A |
| 4,186,785 | 2/1980 | Bilsback | 145/32 R |

FOREIGN PATENT DOCUMENTS

| 609349 | 11/1960 | Canada | 145/33 R |
| 889673 | 1/1972 | Canada | 145/32 R |
| 100057 | 6/1925 | Fed. Rep. of Germany | 145/33 R |
| 2344365 | 10/1977 | France | 145/33 A |
| 201764 | 2/1966 | Sweden | 145/33 E |

Primary Examiner—Nicholas P. Godici
Assistant Examiner—J. T. Zatarga
Attorney, Agent, or Firm—Wagner & Bachand

[57] ABSTRACT

A bow saw comprising a pair of elongated frame members interconnected by an over center hinge structure rigidly coupling the first and second frame members for relative movement between a parallel storage position and an angled operating position, and a saw blade mounted in tensioned relation between the ends of the frame members remote from the hinge structure, the saw blade locking the members in angled relation when tensioned therebetween. At least one of the frame members is hollow and its major length of minimum transverse dimension sufficient to allow the blade to be stored within the hollow member.

6 Claims, 5 Drawing Figures

FOLDING BOW SAW

BACKGROUND OF THE INVENTION

This invention has to do with bow saws and more particularly with a folding bow saw of the type highly useful in camping, backpacking and other outdoor activities. A number of portable lightweight saws have been developed over the years, but there remains the need for an ultra-lightweight saw which has the features of collapsability to the smallest possible size, storage in a snagging-free place for the saw blade when not in use, and sufficient rigidity to adequately perform cutting tasks rapidly when the saw is in its operating condition.

SUMMARY OF THE INVENTION

It is, therefore, an object to the present invention, to provide a folding bow saw. It is more particularly an object of the invention to provide a folding bow saw which affords the advantages of ultra-lightweight, provision of blade storage means, collapsability to the smallest possible size, and rigidity in use sufficient for effective sawing.

These and other objects of the invention to become apparent hereinafter are realized in a bow saw, comprising an arched structure which includes an elongated first member and an elongonated second member defining a handgrip, and a saw blade mounted in tensioned relation between the opposite ends of the bow members, and particularly in the improvement comprising an over center hinge structure rigidly coupling the first and second members for relative movement between a generally parallel, storage position and an angular operating position, the saw blade locking the members in the angled relation when tensioned therebetween.

In particular embodiments, one or both of the bow members are tubular; the bow is preferably assymetrically arched to define the outer end; the hinge structure is located at the highest point of the bow; the blade and one of the tubular elongated bow members are relatively sized such that the blade is storable within that member; the tubular member includes a restricted section whereby the extent of insertion of the blade therein for storage is delimited; the restricted section typically adjoining the hinge structure; this tubular member being curved generally in the plane of the hinge structure, and the blade being likewise curved when stored, and oriented within the tubular member by the member restricted section; the bow members are so coupled as to relatively rotate through approximately 270 degrees about the hinge structure; the first and second bow members have opposed ends remote from the hinge structure, and these remote ends define blade receiving slots. Slot engaging means such as pins are carried by the blade in spaced relation for tensioning of the blade between the remote ends of the members when engaged.

In particularly preferred embodiments, the invention contemplates an over center hinge structure which comprises a plate having a flange, the plate mounting one of the bow members adjacent its flange and radially spaced therefrom on the plate, a hinge pin normal to the plate and in journaled relation with the other of the bow members, and the plate flange defining a stop shoulder cooperating with the saw blade to maintain the bow member at a predetermined angled position for saw blade operation. In this last mentioned embodiment, the blade and the tubular first bow member are relatively sized such that the blade is storable within the bow member; the blade storing tubular member may include a dimensionally restricted section whereby extent of insertion of the blade therein for storage is delimited, the section typically adjoining the hinge structure; the bow being preferably assymetrically arched to define, and the hinge structure being located at, the highest point of the arch; the bow members being relatively rotatable through approximately 270 degrees about the hinge structure, the first and second bow members having spaced ends remote from the hinge structure; and the ends defining blade receiving slots, and slot engaging means carried by the blade in spaced relation thereon for tensioning of the blade between the bow members in the slot engaged condition of the slot engaging means, and the slot engaging means comprising pins carried by the blade transversely to the slot and sized to engage the slot walls.

BRIEF DESCRIPTION OF THE DRAWINGS

The invention will be further described as to an illustrative embodiment in conjunction with the attached drawings in which.

DESCRIPTION OF THE PREFERRED EMBODIMENTS

Figure 1:
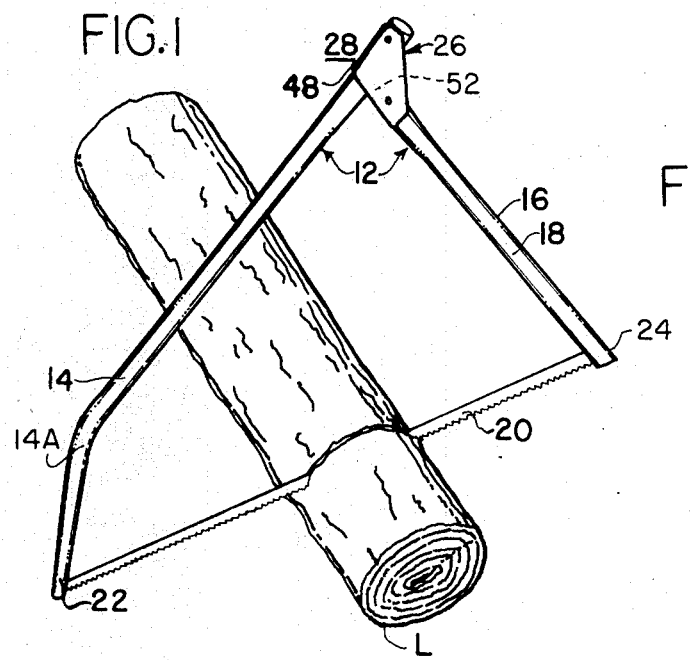
FIG. 1 is a perspective view of the folding bow saw of the invention.

With reference now to the drawings in detail, in FIG. 1 a bow saw according to the invention is depicted at 10, and shown to comprise an arched rigid bow 12 having a partially curved first member 14 and a relatively straight second member 16, the second member defining a handgrip area 18. A saw blade 20 is mounted in tensioned relation between the ends 22, 24 of the respective bow members, the blade and bow 12 being proportioned so that the bow is slightly flexed together at ends 22, 24 when the saw blade 20 is in position, e.g. for sawing the workpiece, log L. The bow saw features for purposes of folding the saw to the most compact form, an over center hinge structure at 26, which rigidly couples the first and second members 14, 16, for relative movement between a generally parallel, storage position, shown in FIG. 2, and approximately a right angle, operating position, shown in FIG. 1, with the saw blade locking the bow members in the fixed relation position when tensioned therebetween.

One and preferably both of the bow members 14, 16 are tubular, suitably fabricated of aluminum tubing. A tubular first member 14 enables storage of the blade 20 nearly wholly within the member as shown in FIG. 2.

A preferred configuration of the present bow saw is one defining an assymetrical arch, as shown in FIG. 1. In such embodiments, the hinge structure is optimally located at the highest point of the arch 28, and the hinge structure adapted to permit the members 14 and 16 to rotate relative to each other about the hinge through approximately 270 degrees.

Figure 3:
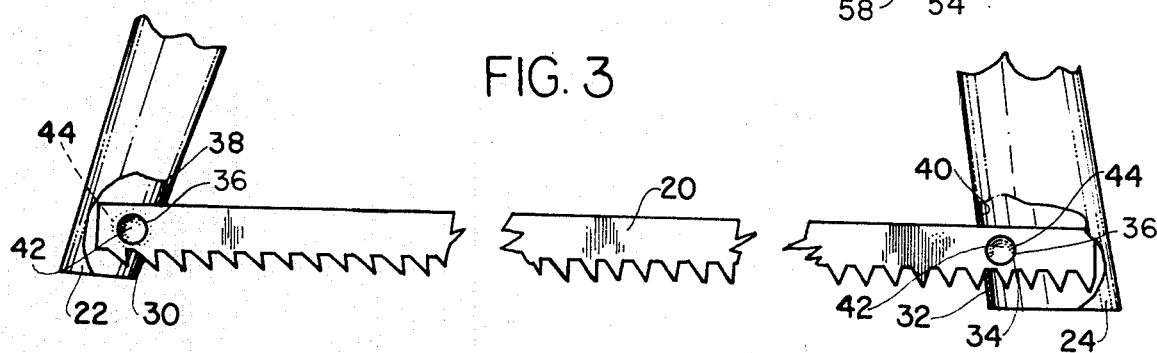
FIG. 3 is a fragmentary view, somewhat enlarged, of the bow member ends with blade mounted therein.

With reference now to FIG. 3, the bow members 14, 16 have, as mentioned, ends 22, 24 which are remote from the hinge structure 26. These ends define blade receiving slots 30, 32 respectively. The saw blade 20 is apertured at its ends to provide holes 34. A slot engaging means in the form of a pin 36 carried by the blade 20 in its holes 34 transversely disposed relative to the slots 30, 32, engages the slot wall 38, 40. The pins 36 comprise a shank 42 and a head 44, the shank typically being peened as at 43 (FIGS. 4,5), to secure the pin on the blade. The spacing of the pins 36 is noteworthy; by carefully spacing the pins relative to the apparent spacing of the ends 22, 24 the desired degree of inward flexure of the bow members 14, 16 is realized to maintain the saw blade 20 in place. The tensioning of the blade 20 derives from the engagement of the pin head 44 with the adjacent slot wall 38, 40. A further benefit accrues from the arrangement of blade 20 and bow member ends 22, 24, as will now be described in conjunction with an explanation of the operation of the hinge structure 26.

Figure 2:
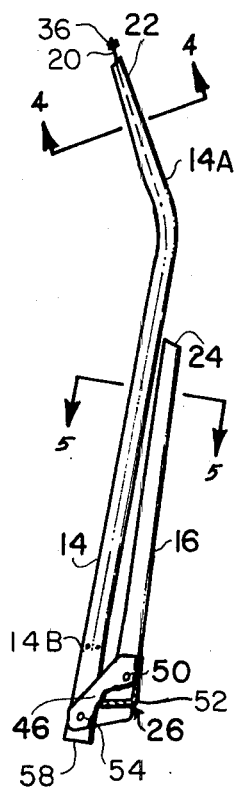
FIG. 2 is a front elevational view of the saw collapsed for storage or transport.
Figure 5:
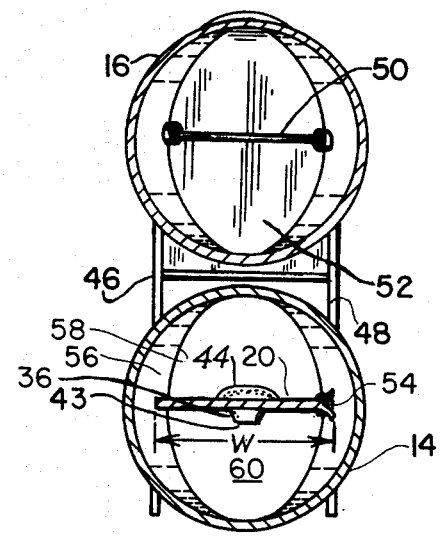
FIG. 5 is a horizontal, sectional view taken on line 5—5 in FIG. 2.

The hinge structure 26 comprises a plate 46 and in some instances a second complementary plate 48 as shown in FIGS. 1, 2 and 5. The plate 46 (together with plate 48 when present) mounts the straight bow member 16 secured e.g. by a rivet 50 and defines an inwardly turned integral flange 52 adjacent the straight bow member 16 in such manner to define a stop shoulder for the straight bow member precluding its passage through a 360 degree turn and acting cooperatively with the tensioned saw blade to maintain the bow members 14, 16 at right angles as the saw blade 20 pulls the bow member ends 22, 24, together and the stop shoulder flange 52 blocks movement to less than a 90 degree relationship between the bow members. The plate 46 further mounts a hinge pin 54 radially spaced from the straight bow member 16, and normal to the plate, the curved bow member 14 being journaled on the hinge pin. The radially spaced relationship of the straight bow member 16, and the curved bow member journalling pin 54 on the plate 46 provides the over center relationship characteristic of the hinge structure of the invention.

Figure 4:
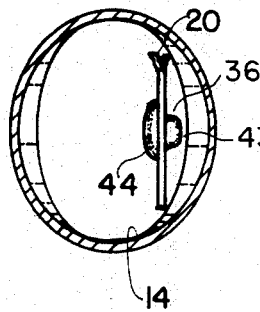
FIG. 4 is a horizontal, sectional view of the first member taken on line 4—4 in FIG. 2, and showing the blade in stored condition within the bow member.

Referring now to FIGS. 2, 4 and 5, the storage of the blade 20 is easily accomplished within the hollow tubular member 14 with the end thereof and pin 36 being visible. The blade 20 traverses the curved end region 14A of FIGS. 1 and 2, and there engages the inner walls of the member 14 to provide a degree of frictional resistance to removal, wanted or unwanted. The end region 14B of member 14, near the hinge 26, is partially flattened to accommodate hinge plates 46 and 48 and to define a section 56 of restricted inner dimension in the member 14, sufficiently to constitute a stop against further insertion of the blade 20. Note in FIG. 2 that the end of the blade 20 is slightly exposed sufficient to be withdrawn from storage. Note also in FIG. 5 that the width W of blade 20 exceeds the transverse opening 58 of the member 14 towards its hinged end. The blade 20 is therefore stopped at the required point in the member 14 to allow reliable safe storage of the blade, and access to its end for easy removal when needed. Orientation of blade 20 is determined by curve 14A which is curved in the plane defined by the hinge plates 46 and 48.

Where the frame member 14 is of circular cross section tubular material and distorted or flattened as shown in FIG. 2 and better in FIG. 4, only the end shown may be inserted into the slot 30 since there is insufficient clearance between the rivet 36 and at the opposite end and the end of the blade. The user is therefore insured of proper orientation of the blade. This is particularly important when using the non standard novel blade of my co-pending patent application referenced below.

An important sidelight of this invention is particularly noticable by reference to FIGS. 4 and 5. In FIG. 4, the minimum transverse dimension of the opening is less than the width W of blade 20. Therefore, blade 20 must be inserted for storage in the direction shown in FIG. 4, i.e. generally parallel to the major axis of the opening in tube 14. This orients the blade to curve around the bend 14a into the main length of member 14. The distortion of the tubing 14 in the region adjacent to the hinge is orthoginal (90 degrees) with respect to the end opening. Therefore the blade 20 is insured of engaging the narrower walls of the tube 14 near the hinge and through engagement of the teeth with the inner wall insure frictional retention of the saw blade within the tube 14. The length of blade 20 is preferably longer than the distance between the restriction adjacent the hinge 26 and the free end of tube 14 so that a small portion extends out of tube 14 for grasping and removal for assembly.

By use of the foregoing apparatus, the woodsman or camper is provided with a lightweight suitably rigid saw, which is readily folded flat for stowing or opened for use. When the bow 12 is folded flat the saw blade is readily stored within the tubular cavity 60 provided by the curved bow member 14. See FIGS. 2, 4, and 5. This invention is usable with any blade suitably dimensioned in width and length. It is particularly suited for use with the improved blade disclosed in my copending application, Ser. No. 114,215, filed Jan. 22, 1980.

I claim:

1. In a bow saw comprising an arched structure which includes an elongated first member and an elongated second member defining a handgrip, and a saw blade mounted in tensioned relation between said bow members, the improvement comprising an over center hinge structure pivotally coupling said first and second members for relative movement between a generally parallel, storage position and an angular operating position, said saw blade locking said members in angled relation position when tensioned therebetween wherein at least one of said members is tubular with an interior dimension sufficient to receive the saw blade and including a first section distorted to a dimension less than the width of the saw blade to define a restricted region;
   and a second section distorted to a dimension less than the width of a saw blade but at a different orientation than the distortion at the first section whereby the saw blade may be inserted for storage in said member aligned with the first section distortion and frictionally engage the second section to hold the blade in place.

2. The combination according to claim 1 wherein said second restricted section adjoins said hinge structure.

3. The combination according to claim 2, wherein said one tubular member is curved generally in the plane of said hinge structure, and wherein said blade is likewise curved when stored and oriented within the tubular member to be blocked by said member second restricted section.

4. Bow saw according to claim 1, in which said bow is assymetrically arched, said hinge structure being located at the highest point of said bow arch.

5. Bow saw according to claim 1, in which said first and second members have opposed ends remote from said hinge structure, said member ends defining blade receiving slots, and slot engaging means carried by said blade in spaced relation thereon for tensioning of the blade between said first and second members when engaged, one of said slots positioned in the broader dimension distorted section whereby a minimum space for the blade end is provided and wherein the opposite end of said blade has a greater length between the slot engaging means and the end of the slot whereby the blade may be inserted in the saw in the preferred direction only.

6. Bow saw according to claim 5, in which said slot engaging means comprises pins carried by said blade transversely to said slots in slot wall engaging relation.

* * * * *